(12) United States Patent
Cannon et al.

(10) Patent No.: US 6,334,178 B1
(45) Date of Patent: Dec. 25, 2001

(54) MULTIPROCESSING SYSTEM WITH AUTOMATED PROPAGATION OF CHANGES TO CENTRALLY MAINTAINED CONFIGURATION SETTINGS

(75) Inventors: David Maxwell Cannon; David Romney Crockett; Michael Allen Kaczmarski, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/144,424

(22) Filed: Aug. 31, 1998

(51) Int. Cl.⁷ .................................................. G06F 15/00
(52) U.S. Cl. ................................. 712/28; 707/201
(58) Field of Search .................. 712/28; 707/8, 707/10, 201

(56) References Cited

U.S. PATENT DOCUMENTS

| | | | |
|---|---|---|---|
| 5,475,819 | 12/1995 | Miller et al. | 395/200.03 |
| 5,537,642 | 7/1996 | Glowny et al. | 395/800 |
| 5,546,595 | 8/1996 | Norman et al. | 395/800 |
| 5,606,693 | 2/1997 | Nilsen et al. | 395/610 |
| 5,652,908 | 7/1997 | Douglas et al. | 395/800 |
| 5,668,986 | 9/1997 | Nilsen et al. | 395/610 |
| 5,815,649 | * 9/1998 | Utter et al. | 714/6 |
| 5,956,719 | * 9/1999 | Kudo et al. | 707/10 |

* cited by examiner

Primary Examiner—David Y. Eng
(74) Attorney, Agent, or Firm—Dan Hubert & Assoc.

(57) ABSTRACT

In a multiprocessing system, hierarchically superior configuration managers maintain profiles of operating characteristics to which subordinate managed units selectively subscribe. If the profiles or operating characteristics change, the configuration managers propagate the changes to all managed units. Each configuration manager stores a record of operating characteristics and multiple server profiles, each profile specifying one or more operating characteristics. A subscription list identifies one or more managed units, each associated with one or more server profiles. Each managed unit acts according to its current operating characteristics, stored locally at the managed unit. If the managed unit receives a profile subscription request from a system administrator, the managed unit sends a subscription message to the configuration manager to subscribe to that input profile. Receiving the subscription, the configuration manager enters the subscribing managed unit and the associated profile into the subscription list, and returns the profiled operating characteristics to the subscribing managed unit. The subscribing managed unit stores these operating characteristics in its record of current operating characteristics. If there is a change to the operating characteristics (or to the profiles), the configuration manager transmits the changed matter to all managed units with affected subscriptions. Upon receipt of this data, each subscribing managed units stores the changed operating characteristics in its record of current operating characteristics.

38 Claims, 5 Drawing Sheets

MULTIPROCESSING SYSTEM WITH AUTOMATED PROPAGATION OF CHANGES TO CENTRALLY MAINTAINED CONFIGURATION SETTINGS

CROSS-REFERENCE TO RELATED APPLICATIONS

The present application is related to co-pending U.S. application Ser. No. 09/144,425 entitled "Comparative Update Tracking to Synchronize Local Operating Parameters with Centrally Maintained Reference Parameters in a Multiprocessing System", filed herewith in the names of David Maxwell Cannon et al., and assigned to International Business Machines Corp. (IBM).

BACKGROUND OF THE INVENTION

1. Field of the Invention

The present invention relates to multiprocessing systems. More particularly, the invention concerns a multiprocessing system in which hierarchically superior configuration managers maintain various profiles of operating characteristics to which subordinate managed units selectively subscribe. Whenever the profiles or operating characteristics change, the configuration managers automatically propagate the changes down to all managed units.

2. Description of the Related Art

In different forms, multiprocessing systems are in widespread use today. As one example, multiprocessing systems include "supercomputers" and other similar machines that utilize many separate high-speed processors. This arrangement is popular because, collectively, the processors provide a tremendously powerful computing engine. Multiprocessing systems also include "distributed processing systems," which use typically multiple physically distinct computing machines to cooperatively perform a task. With this arrangement a computing task that is too intensive for any one machine can be spread out and processed in smaller parts by many different machines. In addition to these examples, multiprocessing systems can include a hybrid of the two, or a variety of other arrangements with multiple computers, microprocessors, application program instances, program threads, or other processing elements.

In one popular example of distributed processing system, many servers are networked to provide a data storage system that provides users with many sophisticated data management capabilities. This is arrangement may be called a distributed storage system; examples of this approach may be found in various known networks implementing the ADSTAR™ Distributed Storage Manager (ADSM)™ software of IBM. Although this and other similar systems constitute a significant advance and even enjoy widespread commercial success today, IBM continually seeks to improve the performance and efficiency of their multiprocessing systems. One area of focus concerns possible improvements to the ease and efficiency of configuring members of such multiprocessing systems.

Particularly, one drawback of the known arrangements is the time needed to individually configure each member of the multiprocessing system to operate as desired. In a system of networked servers, for example, configuration may involve a system administrator executing various configuration commands at a number of different networked servers to initially configure the servers, and thereby establish the servers' operating characteristics. In many cases, this is done by the system administrator individually logging-in to each desired server and then executing a command. In more advanced systems, the system administrator may remotely log-in to desired servers remotely via another, nearby server. In either case, when many different servers are involved, there is a significant time penalty, since the administrator must take steps to execute each configuration command at the desired server. Moreover, this time penalty can arise repeatedly, since the same steps are required to reconfigure a server due to any updated operating requirements.

This time inefficiency presents a number of problems. First, it burdens the system administrator with work, making the system more costly to operate. As another limitation, the manual configuration and reconfiguration technique can be too error prone for some applications. In some cases, for example, many storage servers may be configured identically and distributed throughout a large office, for reasons of performance and scalability. In this situation, it is desirable to maintain the configuration of these servers in lock step, and thus all configuration changes must be universally applied to all servers. However, this is difficult and vulnerable to error due to the lengthy and repetitive entry of configuration commands at each server. Consequently, the known techniques for configuring members of a distributed processing system are not completely adequate for some applications due to certain unsolved problems.

SUMMARY OF THE INVENTION

Broadly, the present invention concerns a multiprocessing system in which hierarchically superior configuration managers maintain various profiles of reference characteristics to which subordinate managed units selectively subscribe. Whenever the profiles or their constituent reference characteristics change, the configuration managers automatically propagate the changes down to all managed units.

Each configuration manager has a storage containing a list of reference characteristics and multiple reference profiles; each reference profile specifies one or more reference characteristics. Also in the storage, a subscription list names each managed unit subscribing to a reference profile, and the identity of that reference profile.

All actions of each managed unit are conducted according to its current operating characteristics, which are stored in a list at the managed unit. Each managed unit also stores a list of its subscribed-to profiles, including the identity and content of those profiles.

Whenever the managed unit receives a subscription request from a source such as a system administrator, the managed unit transmits a subscription message to the configuration manager to subscribe to a reference profile identified by the request.

Receiving the subscription, the configuration manager enters the subscribing managed unit and the requested reference profile into the configuration manager's subscription list, and returns the operating characteristics of the reference profile to the subscribing managed unit. The subscribing managed unit stores these operating characteristics in its list of current operating characteristics.

Whenever there is a change to the reference characteristics (or to the reference profiles), the configuration manager transmits the changed operating characteristics (or changed profiles) to all managed units having affected subscriptions. After receiving this new information, each managed unit stores any changed operating characteristics in its list of operating characteristics, and also stores any changed profiles in its list of subscribed-to profiles.

Accordingly, one embodiment of the invention concerns a method to operate a multiprocessing system where hierarchically superior configuration managers maintain various profiles of reference characteristics to which subordinate managed units selectively subscribe, and the configuration managers automatically propagate any profile and reference characteristic changes down to all affected managed units.

In another embodiment, the invention may be implemented to provide an apparatus such as a multiprocessing system, configuration manager, and/or managed unit, configured to operate as discussed above. In still another embodiment, the invention may be implemented to provide a signal-bearing medium tangibly embodying a program of machine-readable instructions executable by a digital data processing apparatus to perform a method to operate one or more components of a multiprocessing system, as discussed above.

The invention affords its users with a number of distinct advantages. First, the invention reduces the time needed to configure and reconfigure computers in a multiprocessing system. Instead of manually issuing commands to configure managed units, the managed units subscribe to centrally maintained configuration profiles and reference characteristics, and automatically receive any changes to the subscribed profiles and reference characteristics. Thus, instead of reconfiguring each managed unit, a system administrator enters changes once at the configuration manager; thereafter, these changes are automatically propagated down to all subscribing managed units. In addition to saving time, this reduces the potential for committing errors in the otherwise tedious work of repeatedly issuing the same configuration commands to the different nodes. Additionally, the invention still maintains the flexibility for managed units to receive and implement local operating characteristics, apart from any subscriptions. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings. As mentioned above, the invention concerns a multiprocessing system in which hierarchically superior configuration managers maintain various profiles of reference characteristics to which subordinate managed units selectively subscribe. Whenever the profiles or reference characteristics change, the configuration managers automatically propagate the changes down to all affected managed units.

HARDWARE COMPONENTS & INTERCONNECTIONS

System Architecture

One aspect of the invention concerns a multiprocessing system, which may be embodied by various hardware components and interconnections. The system includes multiple nodes, including one or more configuration managers and one or more managed units. Each managed unit is coupled to a hierarchically superior configuration manager. Configuration managers themselves may also act as managed units with respect to other, hierarchically even more superior configuration managers.

Figure 1:
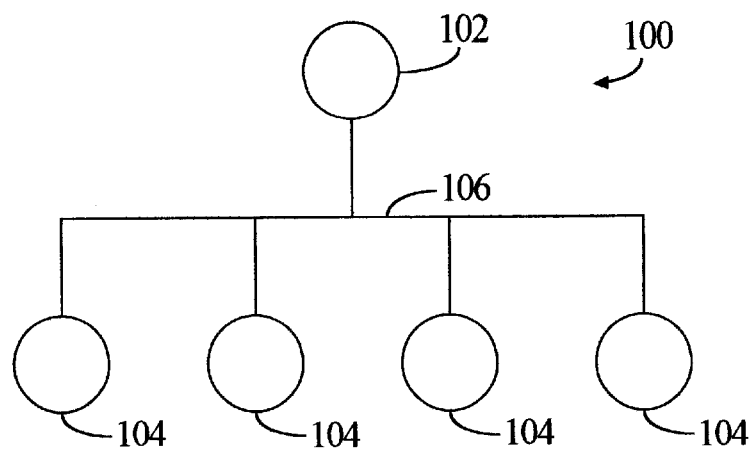
FIG. 1 is a block diagram of one exemplary architecture of multiprocessing system in accordance with the invention.

One example is the system 100 shown in FIG. 1. The system 100 includes multiple nodes, including a configuration manager 102 and multiple managed units 104. The managed units 104 and configuration manager 102 are connected by a communications link 106.

Figure 2:
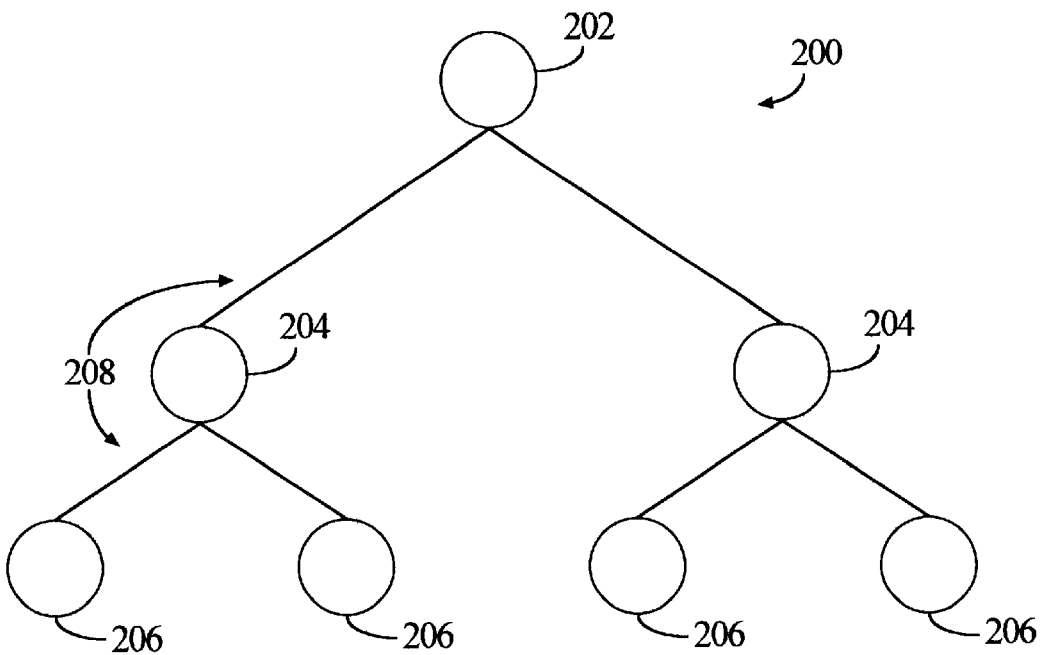
FIG. 2 is a block diagram of a different exemplary architecture of multiprocessing system, with configuration managers at multiple levels, in accordance with the invention.

FIG. 2 depicts another example, with multiple managed units 206 that operate under a pair of configuration managers 204. The configuration managers 204, which answer to a higher-level configuration manager 202, may themselves operate as managed units in addition to their roles as configuration managers. The nodes of FIG. 2 are interconnected as shown by the communications link 208.

In addition to the arrangements of FIGS. 1–2, there are many other possible architectures embodying the invention, as will be apparent to those of ordinary skill in the art having the benefit of this disclosure. The multiprocessing system of the invention may be implemented with similar subcomponents, whether embodied by the system 100 (FIG. 1), the system 200 (FIG. 2), or another arrangement. As an example, each node (e.g., configuration manager or managed unit) of the system may comprise a processing element, such as a computing machine, software, or a combination. As examples of computing machines, each node may comprise a personal computer, mainframe computer, workstation, microprocessor, or another digital data processing machine. In contrast, a node may instead comprise an instance of an application program, a software thread, subroutine, or another software construct. Nodes may also be provided by combinations of hardware, software, firmware, and the like.

Each node, whether configuration manager or managed unit, may be implemented by similar or even identical hardware. Accordingly, the configuration managers and managed units may operate together on a "peer-o-peer" basis. As an example, all nodes may comprise digital data storage servers, such as IBM brand RS/6000 machines, running the ADSTAR Distributed Storage Manager (ADSM) storage management software.

The node-interconnecting communications link, such as the links 106 or 208, comprises a suitable hardware and/or software mechanism to relay messages between the nodes. For example, the links 106, 208 may comprise telephone lines, cable television lines, an Ethernet, token ring, ATM network, local area network, wide area network, Internet, Intranet, etc. In implementations where two or more nodes comprise separate application program instances on the same machine, the communications link also includes a motherboard, backplane, LAN card, bus, or other necessary hardware and/or software interconnecting these nodes. Communications over these links may employ any suitable protocol, such as TCP/IP, APPC, etc.

Configuration Manager

Figure 3:
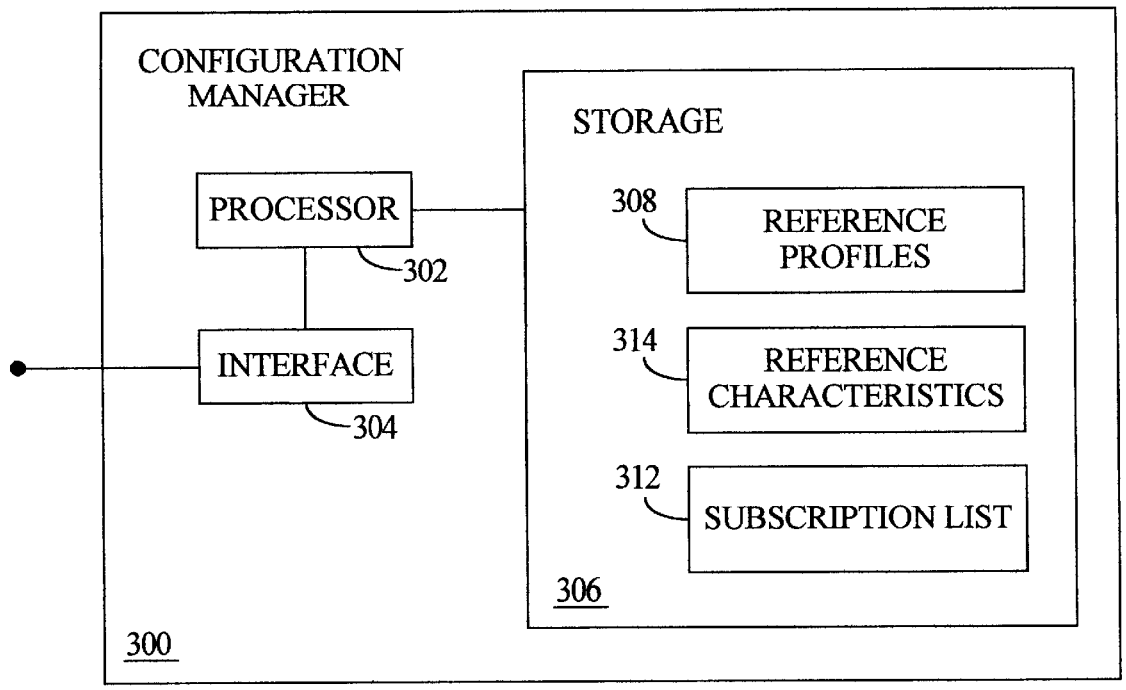
FIG. 3 is a block diagram of an exemplary configuration manager in accordance with the invention.

FIG. 3 shows the subcomponents of an exemplary configuration manager 300 in more detail. The configuration manager 300 includes a processor 302, an interface 304, and a storage 306. The processor 302 may comprise one or more microprocessors, an application-specific integrated circuit, or any other suitable digital data processing element. The interface 304 facilitates communications between the processor 302 and an attached communications link (not shown). The interface 304 may comprise a modem, intelligent input/output channel, bus, or any other suitable structure.

The storage 306 comprises writable non-volatile storage such as magnetic disk storage media, magnetic tape, optical media, battery-supported random access memory (RAM), and the like. The storage 306 includes reference profiles 308, reference characteristics 314, and a subscription list 312. The reference profiles 308 and reference characteristics 314 may be collectively called "reference parameters."

Generally, the reference characteristics 314 comprises a centralized storage of various machine-readable configuration settings. To all managed units of the configuration manager 300 ("subordinate" managed units), the reference characteristics 314 are read-only. As explained below, the subordinate managed units copy selected reference characteristics to local storage, and then use the copied characteristics as locally stored "operating characteristics." Each managed units uses its locally stored operating characteristics to guide its operation.

The list of reference profiles 308 comprise a number of individual reference profiles, where each profile is a group of one or more reference characteristics. To the subordinate managed units, the reference profiles 308 are read-only. As discussed below, the managed units "subscribe" to selected reference profiles, thereby indicating a desire to keep locally stored operating characteristics up-to-date with the state of the selected reference profiles. The configuration manager 300 uses the subscription list 312 to track which subordinate managed units have subscribed to which reference profiles. In one embodiment, where the reference profiles have version codes to distinguish updated profiles from earlier versions, the configuration manager may also use the subscription list 312 to track whether the subscribing managed units have received up-to-date reference characteristics.

To provide a more concrete example, Tables 1–3 (below) depict an exemplary set of reference profiles 308, reference characteristics 314, and subscription list 312 in a data storage system where each node is a data storage server.

TABLE 1

Reference Profiles

| PROFILE NAME | ASSOCIATED REFERENCE CHARACTERISTICS |
|---|---|
| Profile A | 1, 3, 4, 8 |
| Profile B | 1, 2 |
| Profile C | 1 |
| Profile D | 5 |

TABLE 2

Reference Characteristics

| REFERENCE CHARACTERISTIC NUMBER | DETAILS |
|---|---|
| 1 | ADMINISTRATOR=MIKE (Password=Wildcat, Authority=System) |
| 2 | ADMINISTRATOR=DAVE (Password=Cougar, Authority=System) |
| 3 | ADMINISTRATOR=CAROLYN (Password=Penguin, Authority=Policy) |
| 4 | SCHEDULE=INCR_BACKUP (Frequency=Daily, Begintime=02:00, DayOfWeek=Any, Action=Incremental) |
| 5 | SCHEDULE=WEEKLY_ARCHIVE (Frequency=Weekly, Begintime=18:30, DayOfWeek=Saturday, Action=Archive) |
| 6 | SCHEDULE=DB_BACKUP (Frequency=Daily, Begintime=05:00, DayOfWeek=Any, Action=DbBackup) |
| 7 | SERVER=CONFIG_MGR (Address=9.115.12.92, Port=1500, Password=batman) |
| 8 | SERVER=TUCSON_BRANCH (Address=9.115.39.123, Port=1500, Password=robin) |

TABLE 3

Subscription List

| MANAGED UNIT | SUBSCRIBED PROFILES |
|---|---|
| DEVICE NUMBER 0001 | Profile A |
| DEVICE NUMBER 0002 | Profile A |
| DEVICE NUMBER 0003 | Profile A, Profile D |
| DEVICE NUMBER 0004 | Profiie B, Profile C |
| DEVICE NUMBER 0005 | Profile D |

Figure 4:
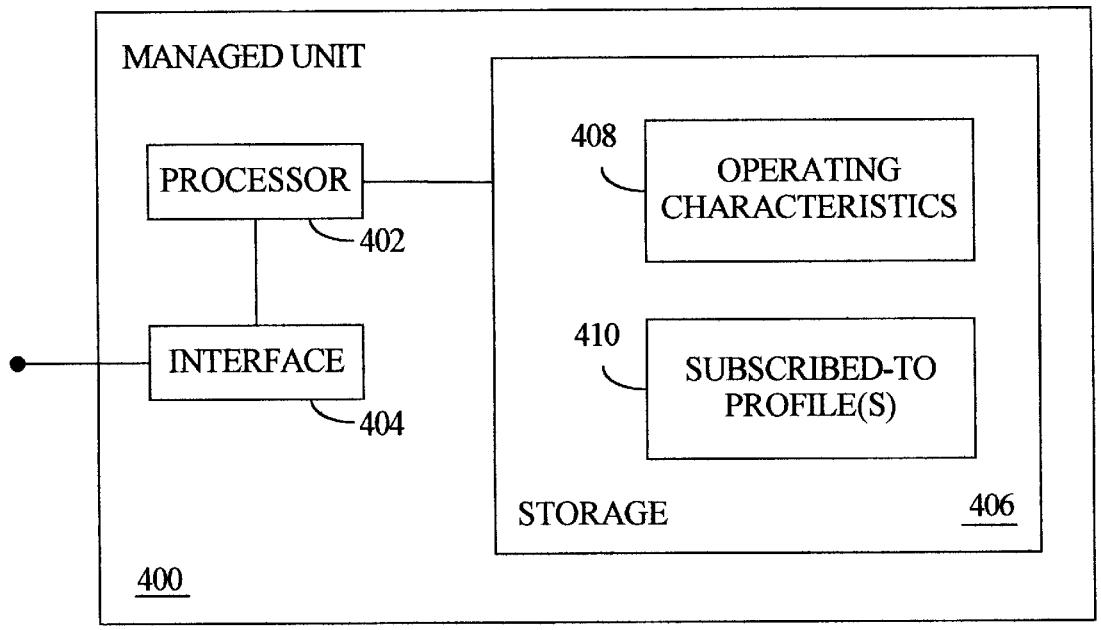
FIG. 4 is a block diagram of an exemplary managed unit in accordance with the invention.

FIG. 4 shows the subcomponents of an exemplary managed unit 400 in more detail. The managed unit 400 includes a processor 402, an interface 404, and a storage 406. The processor 402 may include one or more microprocessors, an application-specific integrated circuit, or any other suitable digital data processing element. The interface 404 facilitates communications between the processor 402 and an attached communications link (not shown). The interface 404 may comprise a modem, intelligent input/output channel, bus, or any other suitable structure.

The storage 406 comprises writable non-volatile storage such as magnetic disk storage media, magnetic tape, optical media, battery-supported random access memory (RAM), and the like. The storage 406 includes operating characteristics 408 and subscribed-to profiles 410.

Generally, the subscribed-to profiles 410 contain the names of zero, one, or more reference profiles 308 (FIG. 3), to which the managed unit 400 subscribes. In the illustrated example, the subscribed-to profiles 410 also include the content of each subscribed-to reference profile in addition to the profiles' names. However, in an alternate embodiment (see "Profile Master View", discussed below), the subscribed-to profiles 410 may omit the profiles' content; in this embodiment, the content of all profiles is contained in a profile master view. The significance of subscription for the managed unit 400 is that the managed unit 400 maintains its own copy of all reference characteristics 314 specified by its subscribed-to profiles 410. This local copy of the reference characteristics 314 is embodied by the operating characteristics 408. The managed unit 400 operates in compliance with the locally stored operating characteristics 408. The operating characteristics 408 may also include other operational characteristics unrelated to the subscribed-to profiles. These additional characteristics, called "local" operating characteristics, may originate from a system administrator, local application program, or another source.

Since a configuration manager's centrally stored reference characteristics 314 and reference profiles 308 may be changed from time to time, the invention provides means to distribute the changes among all affected subordinate managed units. This technique is discussed in greater detail below.

Exemplary Digital Data Processing Apparatus

Another aspect of the invention concerns a digital data processing apparatus, provided to implement one ore more managed units or configuration managers. This apparatus may be embodied by various hardware components and interconnections, as discussed below.

Figure 5:
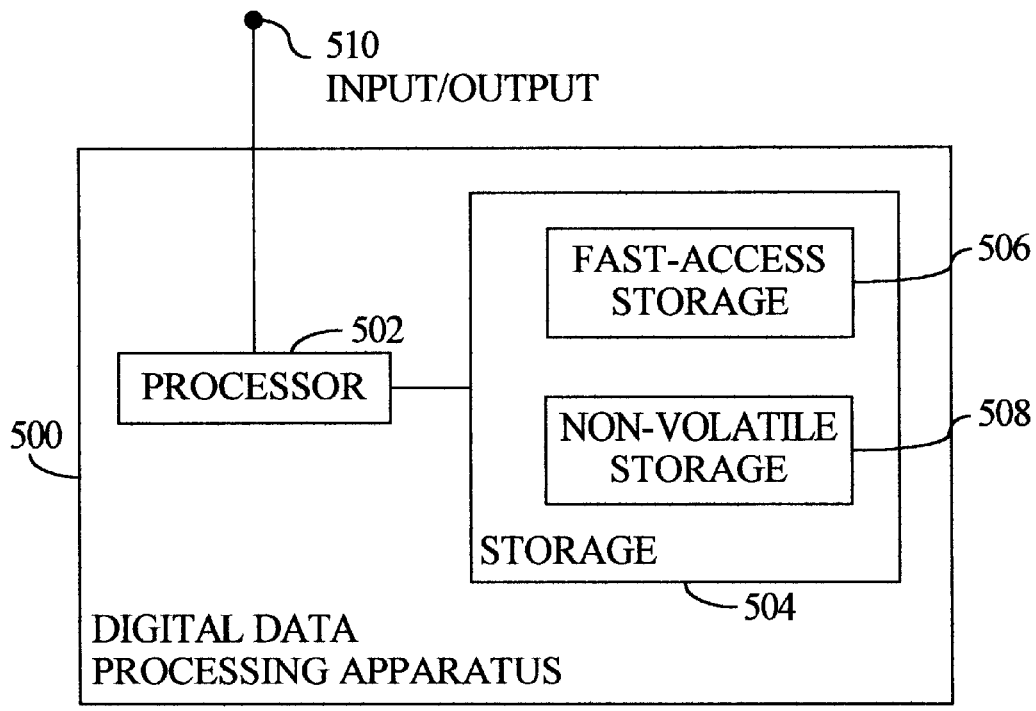
FIG. 5 is a block diagram of a digital data processing machine in accordance with the invention.

FIG. 5 shows an example of one digital data processing apparatus 500. The apparatus 500 includes a processor 502, such as a microprocessor or other processing machine, coupled to a storage 504. In the present example, the storage 504 includes a fast-access storage 506, as well as nonvolatile storage 508. The fast-access storage 506 may comprise RAM, and may be used to store the programming instructions executed by the processor 502. The nonvolatile storage 508 may comprise, for example, one or more magnetic data storage disks such as a "hard drive," a tape drive, or any other suitable storage device. The apparatus 500 also includes an input/output 510, such as a line, bus, cable, electromagnetic link, or other means for the processor 502 to exchange data with other hardware external to the apparatus 500.

Despite the specific foregoing description, ordinarily skilled artisans (having the benefit of this disclosure) will recognize that the apparatus discussed above may be implemented in a machine of different construction, without departing from the scope of the invention. As a specific example, one of the components 506, 508 may be eliminated; furthermore, the storage 504 may be provided on-board the processor 502, or even provided externally to the apparatus 500.

OPERATION

In addition to the various hardware embodiments described above, a different aspect of the invention concerns a method for operating a multiprocessing system, where hierarchically superior configuration managers maintain various profiles of reference characteristics to which subordinate managed units selectively subscribe, and the configuration managers automatically propagate any changes down to all affected managed units whenever the reference profiles or reference characteristics change.

Signal-Bearing Media

In the context of FIGS. 1–5, such a method may be implemented, for example, by operating the configuration managers and managed units, as embodied by digital data processing apparatuses 500, to execute respective sequences of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform the functions of configuration manager or managed unit as explained herein.

Figure 6:
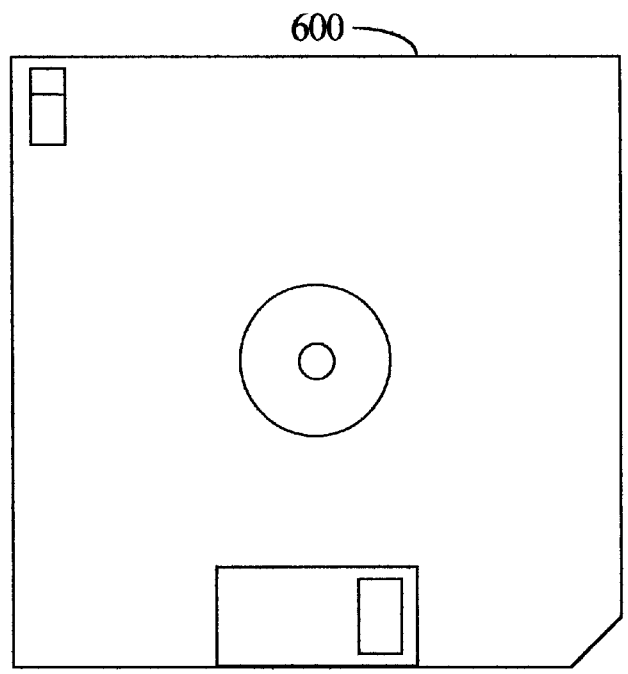
FIG. 6 shows an exemplary signal-bearing medium in accordance with the invention.

This signal-bearing media may comprise, for example, RAM (not shown) contained within storage of the configuration manager or managed unit, as represented by the fast-access storage 506 for example. Alternatively, the instructions may be contained in another signal-bearing media, such as a magnetic data storage diskette 600 (FIG. 6), directly or indirectly accessible by the processor 502. Whether contained in the storage 506, diskette 600, or elsewhere, the instructions may be stored on a variety of machine-readable data storage media, such as direct access storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Configuration Manager: Operation

Figure 7:
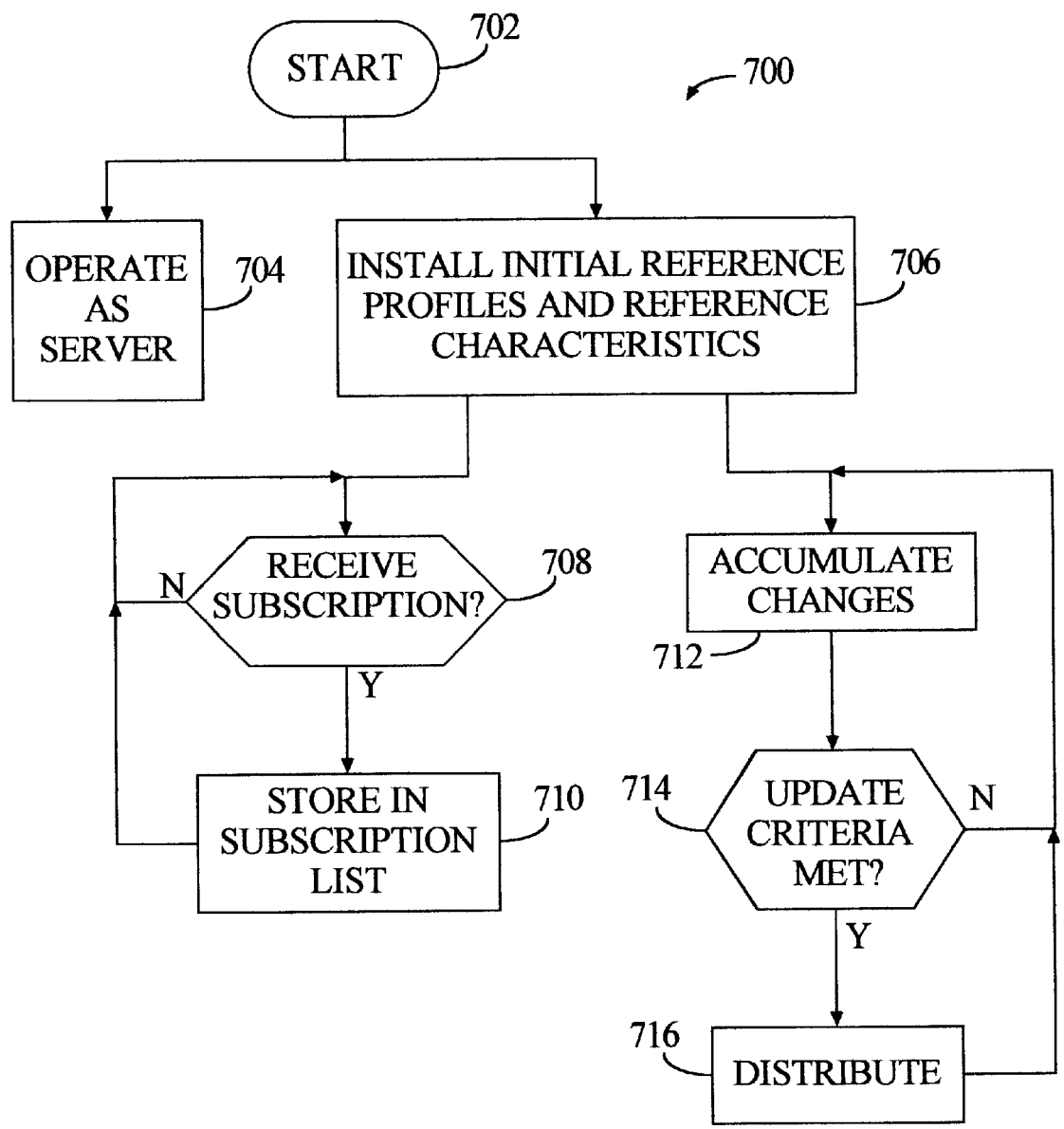
FIG. 7 is a flowchart of an exemplary operating sequence for a configuration manager in accordance with the invention.

As mentioned above, configuration managers maintain various reference profiles to which subordinate managed units selectively subscribe. Whenever the profiles or their reference characteristics change, the configuration managers propagate the changes down to all affected managed units. FIG. 7 shows an exemplary process sequence 700 to describe the operation of an exemplary configuration manager in a multiprocessing system according to the invention. For ease of explanation, but without any intended limitation, the example of FIG. 7 is described in the context of the hardware environment described above in FIGS. 1–4.

The operations 700 are initiated in step 702, which may be performed when the configuration manager 300 is powered-up, re-started, or otherwise begins operation. Following step 702, the configuration manager 300 may (optionally) conduct other operations 704, aside from its role as a configuration manager. For instance, in the data storage system embodiment used presently, the configuration manager 300 may operate as a data server, as shown by step 704.

Concurrently with these non-manager operations (step 704), the configuration manager 300 performs tasks involved in overseeing the managed units (steps 706–716). Specifically, in step 706 the configuration manager installs an initial set of reference profiles 308 and reference characteristics 314. As an example, these initial settings may be manually set by a system administrator.

After step 706, the configuration manager 300 begins the concurrent processes of (1) receiving and processing managed units' subscriptions, and (2) accumulating and propagating changes to reference profiles and/or reference characteristics that affect subscribing managed units. Step 708 starts the subscription process. Namely, in step 708 the configuration manager 300 waits until it receives a subscription message from a managed unit. Subscription messages comprise requests from managed units to subscribe to one of the pre-defined reference profiles 308. As such, a subscription message includes the name of the desired reference profile, and the identity of the managed unit requesting subscription. When the configuration manager 300 receives a subscription message in step 708, the configuration manager 300 updates the subscription list 312 to show the subscribed-to profile in association with the subscribing managed unit (step 710). Following step 710, step 708 waits for another subscription.

In parallel with steps 708–710, the configuration manager 300 collects and distributes changes to the reference parameters. As an example, these changes may originate from a system administrator (not shown) accessing the configuration manager. To provide another example, these changes may originate from another configuration manager that is hierarchically superior to the present configuration manager 300, where this superior configuration manager propagates the changes downward to the present configuration manager 300.

The configuration manager 300 receives and accumulates the changes in step 712. These changes may include changes to the reference characteristics 314 and/or the reference profiles 308. The accumulation of the changes in step 712 may involve (1) buffering changes and then implementing them in storage 306, (2) not buffering any changes but marking the changed profiles and/or characteristics in a directory such as a table, list, bitmap, etc., or (3) another approach.

In step 714, the configuration manager 300 determines whether certain prescribed update criteria have been met to start distributing the accumulated changes. The update criteria may be set by a system administrator or other user, permanently incorporated into the firmware or other programming of the processor 302 upon manufacture of the configuration manager 300, or established in another way. As mentioned above, the update criteria determine when the configuration manager 300 propagates changes in the reference parameters down to the subordinate managed servers. The criteria may take various embodiments in accordance with this invention, such as:

Threshold Number of Changes: As one example, the configuration manager 300 may deem the criteria met whenever it receives a threshold number of changes, such as five changes.

Fixed Time Period: As another example, the configuration manager 300 may deem the criteria met on a periodic basis, such as one hour. In this embodiment, the criteria may be met, for example, each time a repeating timer expires.

Request by Subordinate Managed Units: As still another example, the configuration manager 300 may deem the criteria met whenever one or more subordinate managed units submit such requests to download accumulated changes. The managed units may submit such requests on any appropriate basis, such as periodically.

If step 714 finds that the update criteria are not met, step 712 continues to accumulate incoming changes. When the update criteria of step 714 are finally met, the configuration manager 300 in step 716 distributes or "propagates" the accumulated changes. To distribute the changes, the configuration manager 300 cross-references the accumulated changes with the subscription list 312 to identify all managed units requiring update propagation. If an accumulated change concerns a change to a reference profile, the configuration manager transmits the changed profile to all managed units subscribing to that profile.

According to one embodiment of the invention, update criteria may be chosen so that they are met individually on a managed-unit-by-managed-unit basis, or more universally for all managed units together. Therefore, in step 716 the configuration manager 300 may propagate updates to all subscribing managed units, or to certain individual managed units requiring updates, depending on which update criteria are used.

If a reference profile has changed, the configuration manager 300 also examines the changed profile to determine whether the profile includes any reference characteristics that were not previously in that profile. If there have been any added reference characteristics, the configuration manager 300 also transmits the new reference characteristics to the subscribing managed units. As an additional feature, the configuration manager 300 may determine whether subscribing managed units already have such reference characteristics due to a subscription to a different profile; in this event, the configuration manager 300 may skip sending the duplicate reference characteristics. When the accumulated changes have been distributed, completing step 716, the routine 700 returns to step 712 to accumulate more changes.

Managed Unit: Operation

Figure 8:
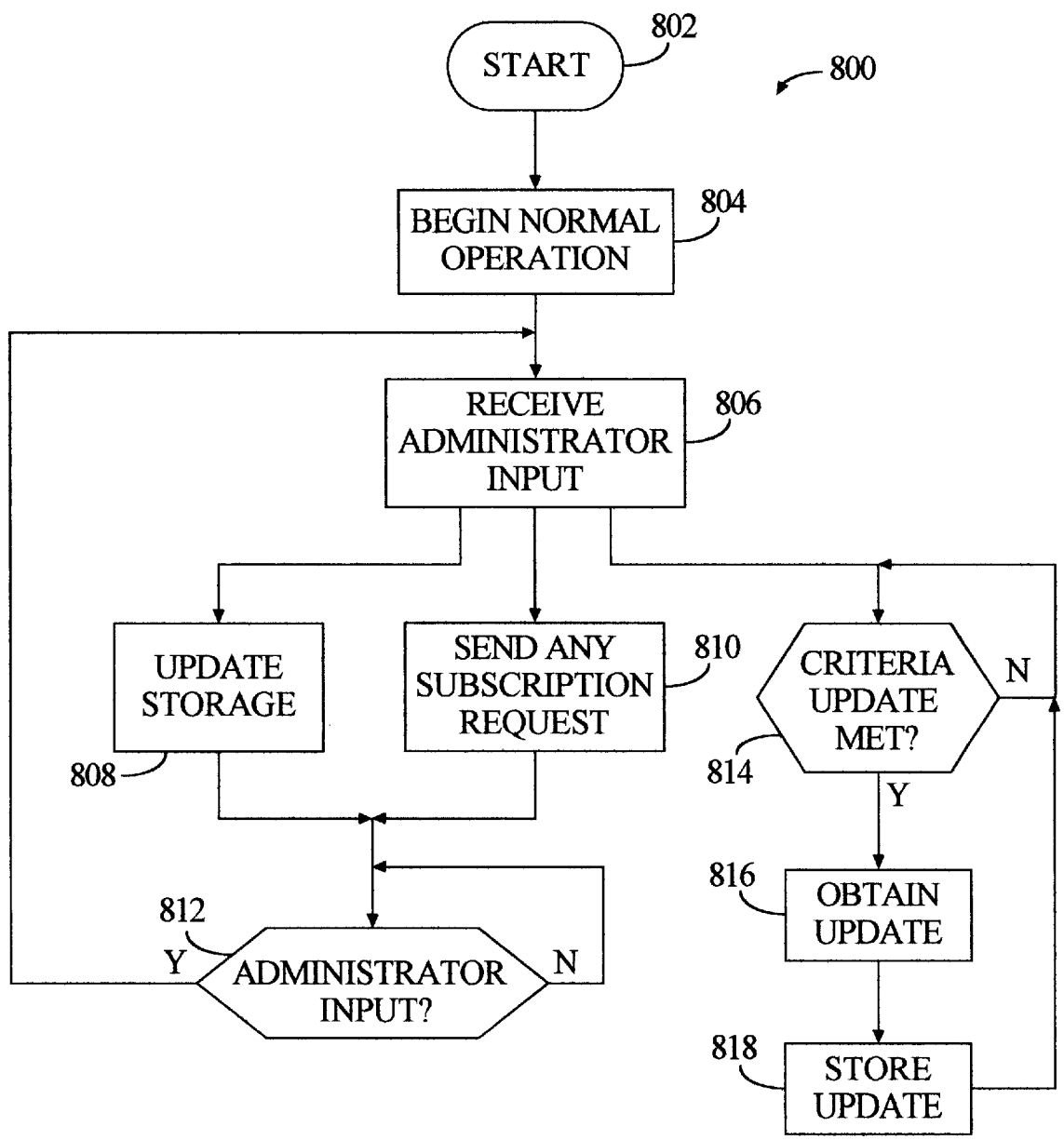
FIG. 8 is a flowchart of an exemplary operating sequence for a managed unit in accordance with the invention.

As mentioned above, managed units selectively subscribe to various reference profiles of constituent reference characteristics maintained by hierarchically superior configuration managers. Whenever the reference profiles or their reference characteristics change, the configuration managers automatically propagate the changes down to all managed units, which store and implement and then operate pursuant to the changes. FIG. 8 shows an exemplary process sequence 800 to describe the operation of an exemplary managed unit in a multiprocessing system according to the invention. For ease of explanation, but without any intended limitation, the example of FIG. 8 is described in the context of the hardware environment described above in FIGS. 1–4.

The operations 800 are initiated in step 802, which may be performed when the managed unit 400 is powered-up, re-started, or otherwise begins operation. Following step 802, the managed unit 400 starts normal operations (step 804). In the illustrated example, where the managed unit is a storage server, these operations may involve satisfying storage access requests of one or more hosts, clients, or other machines (not shown) coupled to the managed unit 400. While these operations continue, the managed unit 400 receives certain input in step 806, for the purpose of initially configuring the managed unit 400. In the illustrated example, this input is received from a system administrator (not shown), who accesses the configuration manager 400 via an attached console, remote terminal, another computer, or another suitable mechanism (not shown). To provide several examples, the input may include:

New Subscription: The input may include a request to subscribe to a profile to which the managed unit 400 does not already subscribe.

Deleted Subscription: The input may specify deletion of a subscription to a profile that the managed unit subscribes to.

Local Operating Characteristics: The input may also include addition or deletion of one or more "locally-set" operating characteristics. These operating characteristics are added by manual input, rather than the managed unit receiving them via subscription. As a result, these operating characteristics are not updated by subscription. As on optional embodiment, the settings of local operating characteristics may automatically yield to any conflicting operating characteristics arising from subscribed-to profiles. This conflict resolution may be set by default, by administration election, or another appropriate means.

After the initial input is received in step 806, several things occur concurrently. Namely, the managed unit 400 updates the storage 406 according to the new input (step 808). In the case of requests to add or delete subscribed-to profiles, the managed unit 400 adds (or deletes) the profiles to (or from) the list of subscribed-to profiles 410. In the case of a locally-set operating characteristics, the managed unit 400 adds (or deletes) the operating characteristics from the list 408. After step 808, the configuration manager 400 determines whether it has received any more input (step 812), such as administrator input in the present example. When the managed unit 400 receives further input, step 812 returns to step 806 to receive this input, as discussed above.

Concurrently with step 808, the managed unit 400 sends any necessary subscription requests (step 810), in order to implement the input of step 806. For instance, if the step 806 input requested subscription to a new profile, the managed unit 400 in step 810 sends a subscription message to the configuration manager 300 to subscribe to that profile. The subscription message includes an identification of the profile and the managed unit 400 requesting subscription. If the input of step 806 requested removal of a subscribed-to profile, the managed unit 400 may send an appropriate message to the configuration manager 300 requesting withdrawal from subscription to that profile. Alternatively, the managed unit 400 may add or delete profiles to/from the list of subscribed-to profiles 410, and wait for the configuration manager 300 to initiate updating of its subscription list 312 to match the managed units' lists of subscribed-to profiles 410. In either case, processing of subscriptions by the configuration manager 400 is discussed above in step 708, FIG. 7.

Concurrently with steps 808, 810, and 812, the managed unit 400 determines whether the prescribed criteria have been met (step 814) to obtain reference parameter updates accumulated by the configuration manager 300. The update criteria may be set by a system administrator or other user, permanently incorporated into the firmware or other programming of the processor 402 upon manufacture of the managed unit 400, or established in another way. As mentioned above, these criteria determine when the managed unit 400 obtains changes in the reference parameters from the configuration manager 300. The criteria may take various embodiments in accordance with this invention, such as:

Locally-Determined Criteria: In one example, the managed unit may deem the criteria met upon any appropriate local condition, such as (1) expiration of a periodic local timer, (2) non-periodic local schedule, or (3) another basis.

Propagation BY Configuration Manager: In another example, the configuration manager alone may determine when to propagate changes to subordinate managed units. As mentioned above, this decision may be made on the basis of receiving a threshold number of changes, expiration of a fixed time period, etc. In this embodiment, the managed unit 400 deems the update criteria to be met (step 814) when changes are propagated from the configuration manager.

Step 814 repeats until the update criteria are met, and then progresses to step 816. In step 816, the managed unit obtains the updated reference parameters. If the update criteria were met by local criteria (e.g., local timer expiration, prescribed local schedule, etc.), then step 816 involves the managed unit 400 requesting and receiving updated reference parameters (if any) from the configuration manager 300.

In contrast, if the update criteria were met by the configuration manager propagating changes according to its own schedule, then step 816 involves the managed unit 400 receiving the propagated changes sent by the configuration manager 300.

In either of the foregoing embodiments, step 816 is followed by step 818, where the managed unit 400 stores the received updates in the storage 406. Following step 818, the routine 800 returns to step 814, awaiting satisfaction of the update criteria again.

Additional Enhancements

To further illustrate one implementation of the invention, a number of optional enhancements are discussed below.

Profile Master View

In this embodiment, the configuration manager and managed units are configured such that each managed unit, upon making its first subscription request (step 810, FIG. 8) obtains and stores a copy of all reference profiles 308, regardless of whether they are subscribed-to or not. In this way, the managed unit constructs its own profile master view (not shown). The profile master view may be stored, for example, in the storage 406.

With the profile master view, the managed unit and configuration manager operate differently, in the following respects. First, the list of subscribed-to profiles 410 is shortened, since it need only include the name (or other identifying indicia) of each subscribed-to profile; the list of subscribed-to profiles need not include the contents of profile. This is because the profile contents are stored in the profile master view.

Additionally, when reference profile updates occur, the configuration manager 300 implements the updates by propagating a new profile master view (step 716, FIG. 7) to all managed units, helping each managed unit to keep a current profile master view. In contrast to reference profile changes, updates to reference characteristics are only sent to managed units affected by the changes (i.e., those that subscribe to reference profiles containing the changed reference characteristics).

This embodiment provides the advantage of a shortened subscription process, since the managed unit does not need to initially receive the content of any newly subscribed-to profiles, which it already has in its profile master view. In addition to expedited subscription, this embodiment can reduce network traffic by decreasing the amount of communications between managed units and their configuration managers.

Partial Reference Characteristic Propagation

As illustrated, when changes to a reference characteristic are propagated (step 716, FIG. 7), the entire content of that reference characteristic is transmitted. Alternatively, the configuration manager 300 may limit propagation to the changed parts of the reference characteristic. This saves transmission time, and expedites the update process. To support partial reference characteristic propagation, the configuration manager 300 is programmed to track the contents of the reference characteristics involved in each managed unit's subscriptions. Then, before distributing updates (step 716, FIG. 7), the configuration manager 300 compares the tracked contents to the current contents to specifically identify the changes. As one example, this process may be achieved by the configuration manager 300 logging changes to reference characteristics in a change log. Another approach involves maintaining versions for reference profile and reference characteristics, as described in greater detail in U.S. application Ser. No. 09/144,425, entitled "Comparative Update Tracking to Synchronize Local Operating Parameters with Centrally Maintained Reference Parameters in a Multiprocessing System", filed herewith, in the names of David Maxwell Cannon et al., assigned to IBM. The entirety of the foregoing application is hereby incorporated into the present application by reference.

As a further expansion to reference characteristic propagation, it may be useful to permit hierarchically arranged reference characteristics. In this embodiment, a "parent" reference characteristic may include, among other things, one or more lower-level reference characteristics. When any lower-level reference characteristic is changed, the "parent" reference characteristic is also considered to be changed. Changes to lower-level reference characteristics are accumulated in step 712, resulting in the subsequent distribution of the entire parent reference characteristic, in the manner discussed above. As an alternative, the propagation of changes to lower-level reference characteristics of a parent reference characteristic may be limited to the changed lower characteristics only, rather than the entire parent.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method for managing configuration of a multiprocessing system that includes a configuration manager and at least one managed unit, the managed unit functioning according to contents of a record of operating parameters stored by the managed unit, the method comprising:

the configuration manager maintaining a record of reference parameters;

at least one managed unit subscribing to selected ones of the reference parameters by performing operations comprising, for each subscribing managed unit:
identifying the selected reference parameters to the configuration manager; and
copying the selected reference parameters into the record of operating parameters;

the configuration manager receiving updates to the reference parameters; and only for each subscribing managed unit subscribing to one or more updated reference parameters, the configuration manager sending the subscribing managed unit all updates to those subscribed-to reference parameters, and in response, each subscribing managed unit updating its record of operating parameters to incorporate the updates.

2. The method of claim 1, where the configuration manager is a first configuration manager and the system also includes a second configuration manager, and the first configuration manager subscribes to selected reference parameters maintained at the second configuration manager.

3. The method of claim 1, where the managed units comprise data storage servers.

4. The method of claim 1, where the configuration manager additionally operates as a data storage server.

5. The method of claim 1, the reference parameters including multiple reference characteristics and multiple reference profiles, each reference profile identifying one or more of the reference characteristics, where:

the subscribing of a subscribing managed unit includes subscribing to one or more selected reference profiles, comprising:
identifying the selected reference profiles to the configuration manager; and
copying the selected reference profiles and all reference characteristics of the selected reference profile into the record of operating parameters.

6. The method of claim 5, the method further comprising the configuration manager maintaining a subscription list identifying each subscribing managed unit in association with the respective reference profiles subscribed to by the subscribing managed unit.

7. The method of claim 1, where:

the method further comprises the configuration manager maintaining a subscription list identifying each subscribing managed unit in association with the respective reference profiles subscribed to by the subscribing managed unit; and the sending of updates by the configuration manager comprises:
the configuration manager consulting the subscription list to identify all subscribing managed units subscribing to reference parameters that have updates; and
the configuration manager sending each identified subscribing managed unit any updates to the reference parameters subscribed to by the subscribing managed unit, and in response, the subscribing managed units updating their records of operating parameters to incorporate the updates.

8. The method of claim 1, further comprising the subscribing managed units requesting updates from the configuration manager, where the operation of the configuration manager sending the subscribing managed units updates is performed in response to update requests from the subscribing managed units.

9. The method of claim 1, where at least one reference parameter is a parent reference parameter including one or more lower-level reference parameters, and the method further comprises:

the configuration manager receiving updates to the lower-level reference parameters; and for each subscribing managed unit subscribing to the parent reference parameter, the configuration manager sending the subscribing managed unit only updates to the lower-level reference parameters, and in response, each subscribing managed unit updating its record of operating parameters to incorporate the updates.

10. The method of claim 1, where at least one reference parameter is a parent reference parameter including one or more lower-level reference parameters, and the method further comprises:

the configuration manager receiving updates to the lower-level reference parameters; and for each subscribing managed unit subscribing to the parent reference parameter, the configuration manager sending the subscribing managed unit all lower-level reference parameters including the updated lower-level reference parameters, and in response, each subscribing managed unit updating its record of operating parameters to incorporate the updates.

11. The method of claim 1, further comprising each subscribing managed unit updating the record of operating parameters, and the subscribing managed unit thereafter functioning according to the updated record of operating parameters.

12. A method for managing configuration settings in a multiprocessing system that includes:

a configuration manager having a storage containing:
multiple reference characteristics and multiple reference profiles, each profile identifying one or more of the reference characteristics;
a subscription list identifying one or more subscribing managed units and associating each identified subscribing managed unit with one or more reference profiles;

at least one subscribing managed unit having a record of operating characteristics, where the subscribing managed unit operates in accordance with contents of the record of operating characteristics;

the method comprising:

a subscription operation, comprising:
  one or more subscribing managed units receiving input identifying one or more reference profiles;
  each subscribing managed unit subscribing by transmitting a subscription message specifying the identified reference profiles to the configuration manager; and
  the configuration manager receiving the subscription messages, and in response, representing each subscribing managed unit in association with its subscribed profiles on the subscription list;
an update propagation operation, comprising:
  the configuration manager and the subscribing managed unit identifying any updates present in (1) reference profiles stored by the configuration manager with respect to corresponding reference profiles as subscribed-to by the subscribing managed unit, and (2) operating characteristics stored by the configuration manager with respect to corresponding reference characteristics stored by the subscribing managed unit;
  the configuration manager transmitting the identified updates to the subscribing managing unit; and
  only the subscribing managed unit receiving the updates and amending the record of operating characteristics accordingly.

13. The method of claim 12, where the method further comprises the subscribing managed unit receiving local operating characteristics from a system administrator, and in response, storing the local operating characteristics in the record of operating characteristics.

14. The method of claim 13, further comprising each subscribing managed unit updating the record of operating parameters and the local operating characteristics, and the subscribing managed unit thereafter functioning according to both the updated record of operating parameters and the record of local operating characteristics.

15. A method for operating a managed unit in a multiprocessing system that includes a configuration manager and at least one managed unit, the managed unit functioning according to contents of a record of operating parameters stored by the managed unit, the configuration manager maintaining a record of reference parameters, the method comprising:
  at least one subscribing managed unit subscribing to selected ones of the reference parameters by performing operations comprising, for each subscribing managed unit:
    identifying the selected reference parameters to the configuration manager; and
    copying the selected reference parameters into the record of operating parameters;
  only for each subscribing managed unit subscribing to one or more updated reference parameters, the subscribing managed unit obtaining any updates to those reference parameters from the configuration manager, and the subscribing managed unit updating its record of operating parameters to incorporate the updates.

16. The method of claim 15, where the managed units comprise data storage servers.

17. The method of claim 15, the reference parameters including multiple reference characteristics and multiple reference profiles, each profile identifying one or more of the reference characteristics, where:
  the subscribing of a subscribing managed unit includes subscribing to one or more selected reference profiles, comprising:
    identifying the selected reference profiles to the configuration manager; and
    copying the selected reference profiles and all reference characteristics of the selected reference profile into the record of operating parameters.

18. The method of claim 15, the subscribing managed unit obtaining updates comprising the subscribing managed unit requesting and then receiving the updates from the configuration manager.

19. A method for operating a configuration manager in a multiprocessing system that includes the configuration manager and at least one managed unit, the managed unit functioning according to contents of a record of operating parameters stored by the managed unit, the method comprising:
  the configuration manager maintaining a record of reference parameters;
  the configuration manager receiving subscription requests from one or more subscribing managed units, each subscription request identifying selected ones of the reference parameters;
  in response to each subscription request, the configuration manager transmitting the selected reference parameters to the subscribing managed unit;
  the configuration manager receiving updates to the reference parameters; and
  only for each subscribing managed unit subscribing to one or more updated reference parameters, the configuration manager sending the subscribing managed unit all updates to those reference parameters.

20. The method of claim 19, where the configuration manager is a first configuration manager and the system also includes a second configuration manager, and the first configuration manager subscribes to selected reference parameters maintained at the second configuration manager.

21. The method of claim 19, where the configuration manager additionally operates as a data storage server.

22. The method of claim 19, the reference parameters including multiple reference characteristics and multiple reference profiles, each profile identifying one or more of the reference characteristics, where each subscription request identifies one or more reference profiles.

23. The method of claim 19, the method further comprising the configuration manager maintaining a subscription list identifying all subscribing managed units and associating each subscribing managed unit with one or more reference profiles.

24. The method of claim 19, where:
  the method further comprises the configuration manager maintaining a subscription list identifying all subscribing managed units and associating each subscribing managed unit with one or more reference profiles; and
  the sending of updates comprises:
    the configuration manager consulting the subscription list to identify any subscribing managed units subscribing to one or more updated reference parameters that have updates; and
    the configuration manager sending each identified subscribing managed unit all updates to those reference parameters subscribed to by the subscribing managed unit, and in response, the subscribing managed units updating their records of operating parameters to incorporate the updates.

25. A signal-bearing medium tangibly embodying a program of machine-readable instructions executable by a digital processing apparatus to perform configuration management operations in a multiprocessing system that includes a configuration manager and at least one managed unit, the configuration management operations comprising:

the configuration manager maintaining a record of reference parameters;

the configuration manager receiving subscription requests from one or more subscribing managed units, each subscription request identifying selected ones of the reference parameters;

in response to each subscription request, the configuration manager transmitting the selected reference parameters to the subscribing managed unit;

the configuration manager receiving updates to the reference parameters; and only for each subscribing managed unit subscribing to one or more updated reference parameters, the configuration manager sending the subscribing managed unit all updates to those reference parameters.

26. The medium of claim 25, where the configuration manager is a first configuration manager and the system also includes a second configuration manager, and the configuration management operations further comprise the first configuration manager subscribing to selected reference parameters maintained at the second configuration manager.

27. The medium of claim 25, where the operations further comprise the configuration manager additionally operating as a data storage server.

28. The medium of claim 25, the reference parameters including multiple reference characteristics and multiple reference profiles, each profile identifying one or more of the reference characteristics, where the operations are performed such that each subscription request identifies one or more reference profiles.

29. The medium of claim 25, the operations further comprising the configuration manager maintaining a subscription list identifying all subscribing managed units and associating each subscribing managed unit with one or more reference profiles.

30. The medium of claim 25, where:

the operations further comprise the configuration manager maintaining a subscription list identifying all subscribing managed units and associating each subscribing managed unit with one or more reference profiles; and the operations of sending the updates comprises:

the configuration manager consulting the subscription list to identify any subscribing managed units subscribing to one or more updated reference parameters that have updates; and the configuration manager sending each identified subscribing managed unit all updates to those reference parameters subscribed to by the subscribing managed unit, and in response, the subscribing managed units updating their record of operating parameters to incorporate the updates.

31. A signal-bearing medium tangibly embodying a program of machine-readable instructions executable by a digital processing apparatus to perform operations of running a managed unit in a multiprocessing system that includes a configuration manager and at least one managed unit, the managed unit functioning according to contents of a record of operating parameters stored by the managed unit, the configuration manager maintaining a record of reference parameters, the operations comprising:

the managed unit subscribing to selected ones of the reference parameters by performing operations comprising:

identifying the selected reference parameters to the configuration manager; and copying the selected reference parameters into the record of operating parameters;

only the subscribing managed unit obtaining any updates to those reference parameters from the configuration manager, and the subscribing managed unit updating its record of operating parameters to incorporate the updates.

32. The medium of claim 31, where the managed units comprise data storage servers.

33. The medium of claim 29, the reference parameters including multiple reference characteristics and multiple reference profiles, each profile identifying one or more of the reference characteristics, where:

the subscribing of a subscribing managed unit includes subscribing to one or more selected reference profiles, comprising:

identifying the selected reference profiles to the configuration manager; and copying the selected reference profiles and all reference characteristics of the selected reference profile into the record of operating parameters.

34. The medium of claim 31, the operations of the subscribing managed unit obtaining updates comprising the subscribing managed unit requesting and then receiving the updates from the configuration manager.

35. A multi-node computing system, comprising:

a configuration manager, comprising:

a storage containing:

a record of multiple reference characteristics;

multiple reference profiles, each reference profile identifying one or more of the reference characteristics;

a subscription list identifying one or more subscribing managed units and associating each subscribing managed unit with one or more reference profiles;

a processor, programmed to:

from the subscribing managing units, receive subscriptions comprising elections of reference profiles, and in response, represent each subscribing managed unit in the subscription list in association with its elected profiles;

transmit any changed reference characteristics to all subscribing managed units subscribing to profiles identifying the changed operating characteristics; and transmit any changed reference profiles to all subscribing managed units subscribing to the changed profiles;

multiple subscribing managed units, each including:

a storage containing a record of operating characteristics; and a processor programmed to:

operate the subscribing managed unit according to contents of the record of current operating characteristics;

manage the record of operating characteristics by:

receiving one or more subscription requests identifying one or more reference profile;

transmitting subscription messages to the configuration manager to subscribe to the identified profiles;

initially receiving all reference characteristics identified by the subscribed-to profiles from the configuration manager and storing the reference characteristics in the record of operating characteristics, and thereafter receiving changes to any reference characteristics identified by the subscribed-to profiles from the configuration manager and storing the changes in the record of operating characteristics.

36. The system of claim 35, each managed unit further programmed to receive local operating characteristics from a system administrator, and in response, store the local operating characteristics in the record of operating characteristics.

37. A configuration manager for use in a multiprocessing system including multiple subscribing managed units, comprising:

a storage containing:
   a record of multiple reference characteristics;
   multiple reference profiles, each reference profile identifying one or more of the reference characteristics;
a processor, programmed to:
   receive subscription requests from one or more subscribing managed units, each subscription request identifying selected ones of the reference parameters to subscribe to;
   in response to each subscription request, transmit the selected reference parameters to the subscribing managed unit;
   receive updates to the reference parameters; and
   for each subscribing managed unit subscribing to one or more updated reference parameters, send the subscribing managed unit all updates to those reference parameters.

38. A managed unit for use in a multiprocessing system including a configuration manager, comprising:

a storage containing a record of operating parameters; and
a processor programmed to:
   subscribe to selected ones of the reference parameters by performing operations comprising:
      identifying the selected reference parameters to the configuration manager; and
      copying the selected reference parameters into the record of operating parameters;
   for each managed unit subscribing to one or more updated reference parameters, obtain any updates to those reference parameters received at the configuration manager, and update the record of operating parameters to incorporate the updates.

* * * * *

UNITED STATES PATENT AND TRADEMARK OFFICE
CERTIFICATE OF CORRECTION

PATENT NO.    : 6,334,178 B1
DATED         : December 25, 2001
INVENTOR(S)   : David Maxwell Cannon et al.

It is certified that error appears in the above-identified patent and that said Letters Patent is hereby corrected as shown below:

Column 11,
Line 36, change "BY" to -- By --.

Column 18,
Line 12, delete "29" and replace with -- 31 --.

Column 20,
Line 17, insert the word -- only -- before "for each" and insert the word -- subscribing -- between "for each" and "managed."

Signed and Sealed this

Ninth Day of July, 2002

Attest:

JAMES E. ROGAN
Director of the United States Patent and Trademark Office

Attesting Officer